United States Patent [19]
Nelson

[11] 4,123,023
[45] Oct. 31, 1978

[54] SYSTEM FOR CONTROLLING VEHICLE MOVEMENT OVER A FIXED GUIDEWAY

[75] Inventor: Robert H. Nelson, Pleasant Ridge, Mich.

[73] Assignee: General Motors Corporation, Detroit, Mich.

[21] Appl. No.: 838,857

[22] Filed: Oct. 3, 1977

[51] Int. Cl.² .............................................. B61L 3/12
[52] U.S. Cl. ............................ 246/182 B; 246/187 B
[58] Field of Search ........... 246/182 B, 182 C, 167 R, 246/122 R, 187 B, 34 R; 340/282, 263, 23; 364/424, 426

[56] References Cited
U.S. PATENT DOCUMENTS

| 3,790,779 | 2/1974 | Paddison | 246/187 B |
| 3,934,125 | 1/1976 | Macano | 246/182 B |

Primary Examiner—Trygve M. Blix
Assistant Examiner—Reinhard J. Eisenzopf
Attorney, Agent, or Firm—Howard N. Conkey

[57] ABSTRACT

A system is described for controlling the movement of a vehicle over a guideway having a specified length. A signal is generated which represents a commanded absolute position of the vehicle on the guideway. A vehicle position transducer provides a signal having a value representing the actual position of the vehicle on the guideway which is compared with the commanded position to provide a position error signal. The speed of the vehicle is controlled in accord with the value of the position error signal. The commanded vehicle position signal is varied with time in a manner to provide desired vehicle motion characteristics including vehicle jerk and acceleration and deceleration values. The system also provides for a constant velocity control mode.

3 Claims, 5 Drawing Figures

SYSTEM FOR CONTROLLING VEHICLE MOVEMENT OVER A FIXED GUIDEWAY

This invention is directed toward a system for automatically controlling the movement of a vehicle over a guideway in a manner so as to achieve predetermined vehicle motion characteristics.

It has widely been proposed in the field of transportation systems to employ the use of a vehicle which is confined on and moved along a guideway to provide for transportation of people and/or cargo. Numerous forms of control systems have been proposed for these guided vehicles including control systems which automatically control the movement of the vehicle over the guideway in a predetermined manner. For example, it has been proposed that a passenger vehicle on a confined pathway be controlled so as to provide for maximum passenger comfort by limiting the magnitude of the acceleration and/or jerk of the vehicle. Generally, the control systems for these vehicles are quite complex particularly when the vehicle speed, acceleration and jerk are controlled in addition to some form of position control when, for example, the vehicle approaches a stopping point at a terminal.

It is the general object of this invention to provide an improved automatic control system for a vehicle moved along a fixed guideway.

It is another object of this invention to provide an improved system for controlling the movement of a vehicle over a guideway employing vehicle position control.

It is another object of this invention to provide a control system for moving a vehicle over a fixed guideway wherein the vehicle motion characteristics are controlled by a signal having an instantaneous value representing a commanded absolute position on the guideway and having time varying characteristics related to desired vehicle motion characteristics.

It is another object of this invention to provide a control system for moving a vehicle over a fixed guideway wherein the vehicle speed is controlled in accordance with the difference between a commanded absolute vehicle position and the actual vehicle position.

It is another object of this invention to provide a vehicle control system for moving a vehicle over a guideway wherein vehicle jerk and acceleration are controlled by controlling the vehicle position in a predetermined time varying manner.

It is another object of this invention to provide an automatic vehicle control system for moving a vehicle over a guideway having position and velocity control modes.

The objects of this invention may be best understood by reference to the following description of a preferred embodiment and the drawings in which.

Figure 1:
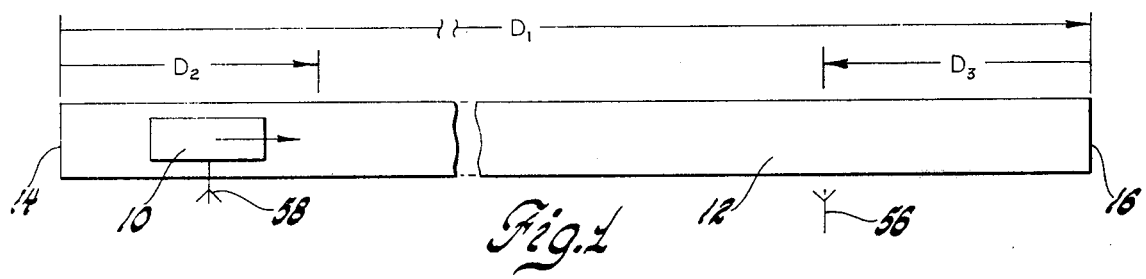
FIG. 1 is a schematic diagram of a vehicle moving over a fixed guideway and which is controlled in accordance with the principles of this invention.

Referring to FIG. 1, the invention is described with respect to a vehicle 10 which is moved the distance $D_1$ over a fixed guideway 12 between a starting point 14 and a stopping point 16. The vehicle 10 and the guideway 12 may take any of the well-known forms. For example, the vehicle 10 may be magnetically levitated and propelled by means of a linear motor.

Figure 3:
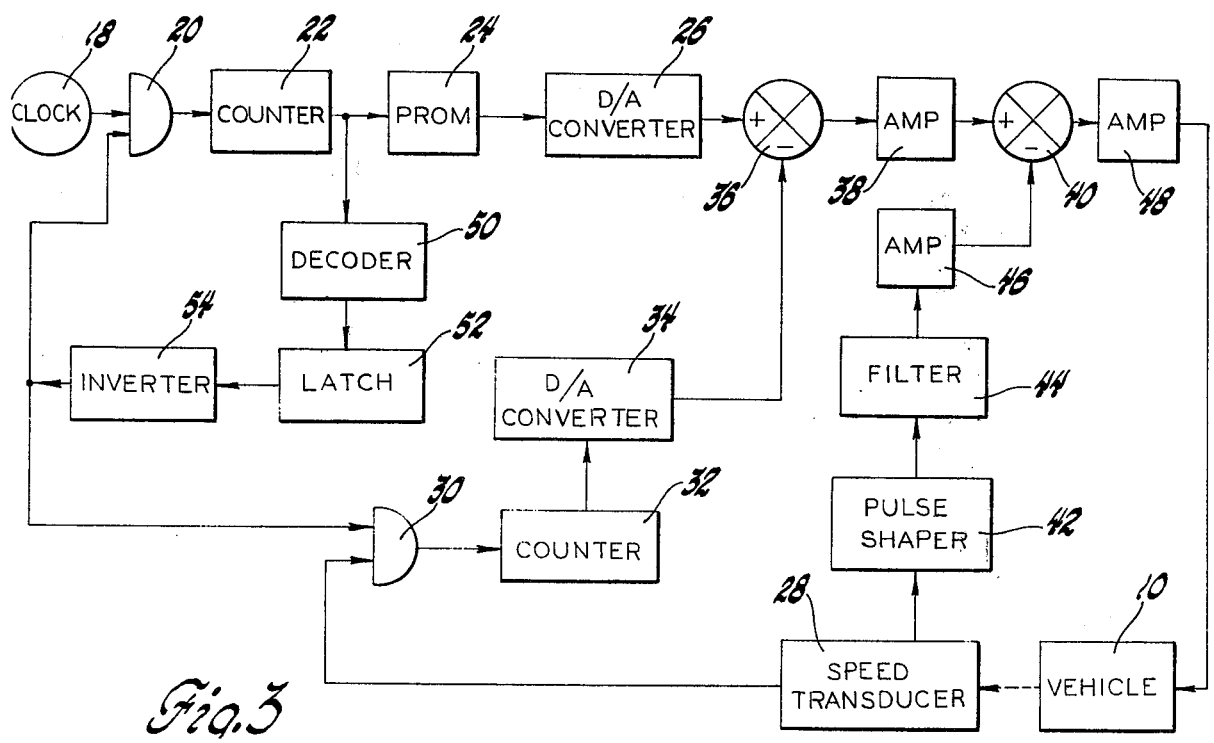
FIG. 3 is a block diagram illustrating the control system for controlling the movement of the vehicle of FIG. 1 in accordance with the principles of this invention.

Referring to FIG. 3, there is illustrated the automatic control system for controlling the vehicle 10 over the guideway 12 with controlled jerk and acceleration/deceleration levels in accordance with the principles of this invention.

During vehicle acceleration over the distance $D_2$ from the starting point 14 and deceleration over the distance $D_3$ to the stopping point 16, the vehicle controller is in a position control mode wherein the vehicle 10 is moved in response to a commanded absolute position on the guideway 12 relative to a reference point which, in the preferred embodiment, is the starting point 14. The commanded position is compared with the actual position of the vehicle 10 on the guideway 12 to provide a position error signal used to control the velocity of the vehicle 10. To provide for controlled vehicle jerk and acceleration, the commanded vehicle position on the guideway 12 is varied with time in a manner related to the desired jerk and acceleration values previously determined, for example, to provide maximum vehicle passenger comfort. Between the position control modes providing vehicle acceleration and deceleration, the vehicle controller is placed in a velocity control mode wherein the vehicle velocity is maintained constant.

The portion of the system for providing a commanded vehicle position on the guideway 12 includes a clock signal generator 18 which provides clock pulses at a substantially constant frequency to one input of an AND gate 20. As will be described, the second input to the AND gate 20 is a logic 1 level when the vehicle controller is in a position control mode and a logic 0 level when the controller is in a velocity control mode. The output of the AND gate 20 is coupled to the clock input of a counter 22 which is initially reset when the vehicle 10 is at the starting point 14 and which counts the clock pulses provided by the clock 18 and coupled thereto through the AND gate 20 when the conroller is in the position control mode (during which the second input to the AND gate 20 is a digital logic 1). The net count represented by the binary number in the counter 22 while counting the clock pulses from the clock 18 increases in a linear fashion.

While in some embodiments the linearly varying net count in the counter 22 could be utilized to represent a commanded vehicle position on the guideway 12, the resulting vehicle motion characteristics including jerk and acceleration may be other than desired. In order to provide the desired vehicle motion characteristics including desired jerk and acceleration values, the count in the counter 22 as represented by the logic states of its counting stages is used to address a programmable read only memory (PROM) 24 which provides an output digital number previously stored in the addressed location and which represents an absolute position on the guideway 12 corresponding to the specific count in the counter 22. The address locations in the PROM 24 are loaded with position values so that as the count of the counter 22 increases from zero, the PROM 24 is sequentially addressed in accordance with the count to provide sequential commanded positions having time varying values determined by the desired vehicle jerk and acceleration.

The output of the PROM 24 is coupled to the input of a digital-to-analog converter 26 whose output is an analog signal having a magnitude representing the commanded vehicle position and which has the time varying characteristics determined to produce the desired vehicle jerk and acceleration values.

To determine the vehicle position error on the guideway 12 relative to the commanded position represented by the magnitude of the output of the digital to analog converter 26, the movement of the vehicle 10 is sensed by means of a speed transducer 28 which is driven by the vehicle 10 and which provides a series of pulses having a frequency related to the speed of the vehicle 10. Each pulse therefore represents an increment of movement of the vehicle 10. For example, the speed transducer 28 may take the form of a reed switch actuated by a magnet rotated by one of the wheels of the vehicle 10. These speed pulses are coupled to one input of an AND gate 30 whose output is coupled to the clock input of a counter 32. As with the AND gate 20, the second input to the AND gate 30 is a logic 1 level when the controller is in a position control mode and a logic 0 level when the controller is in a velocity control mode. When the controller is in a position control mode, the counter 32 totalizes the output pulses from the speed transducer 28 and the net count represents the actual vehicle position on the guideway 12. This digital output of the counter 32 representing the actual vehicle position on the guideway 12 is coupled to the input of a digital-to-analog converter 34 whose output is an analog signal having a magnitude representing the actual vehicle position. This analog signal is compared with the analog signal output of the digital-to-analog converter 26 representing a commanded position by a summer 36 which generates a position error signal representing the difference between the commanded and actual vehicle positions. The position error signal is coupled to the input of an amplifier 38 whose output represents a vehicle velocity command.

The vehicle velocity is controlled in response to the velocity command signal by a velocity control loop. In this respect, the velocity command signal output of the amplifier 38 is coupled to the positive input of a summer 40 and is compared thereby with a signal representing the actual vehicle velocity. The signal representing the actual vehicle velocity is provided by a pulse shaper 42 which is responsive to the speed signal output of the speed transducer 28 to provide pulses having a constant amplitude and duration at the frequency of the output signal from the speed transducer 28. These pulses are coupled to a filter 44 whose output is coupled to the input of a scaling amplifier 46. The output of the scaling amplifier 46 comprises the vehicle velocity signal. The difference between the commanded velocity represented by the output of the amplifier 38 and the actual velocity represented by the output of the amplifier 46 is coupled to the input of a scaling amplifier 48 whose output represents a velocity error signal. This error signal is used by conventional speed controlling apparatus on the vehicle 10 to control the speed in accord with the output of the amplifier 38.

As previously indicated, the apparatus of FIG. 3 also provides for a constant velocity mode of travel of the vehicle 10 over the guideway 12. In this control mode, the vehicle velocity is maintained at a constant value between position control modes. This constant velocity mode is provided by means of a decoder 50 which monitors the count in the counter 22. When the count in the counter 22 represents a predetermined commanded position on the guideway 12 which, for purposes of illustration is at the distance $D_2$ from the starting point 14, the decoder 50 provides a latching signal which is coupled to the input of a latch circuit 52 whose output shifts from a normal logic 0 level to a logic 1 level. This output is coupled to an inverter 54 whose output is coupled to respective inputs of the AND gates 20 and 30.

During the acceleration and deceleration periods of the movement of the vehicle 10, the output of the latch 52 is a logic zero and the output of the inverter 54 is a logic 1 which places the system in the position control mode previously described. However, when the vehicle's commanded position reaches the predetermined value, distance $D_2$ in this embodiment, the AND gates 20 and 30 are inhibited and the counters 22 and 32 maintain the counts contained therein so that the position error, fixed in time, becomes a constant. Therefore, the velocity control signal output of the amplifier 38 remains a constant value so that the vehicle velocity is controlled to a constant value.

When the vehicle 10 approaches the end of the guideway 12, control is shifted from the constant velocity mode provided by the decoder 50 and latch 52 to the position control mode so as to decelerate the vehicle 10 in response to clock pulses supplied to the counter 22. The transition from the constant velocity control mode to the position control mode is provided by means of a sender element 56 positioned adjacent the guideway 12 at the point where it is desired to initiate deceleration of the vehicle 10 and a receiving element 58 carried by the vehicle 10. When the receiving element 58 senses a signal provided by the sending element 56, the latch circuit 52 is reset to enable the AND gate 20 to couple the clock signals from the clock 18 to the counter 22 and the AND gate 30 to couple the speed signal from the speed transducer 28 to the counter 32. Thereafter, the vehicle 10 is decelerated in accordance with the commanded positions provided by the PROM 24 in response to the addressed locations determined by the count of the counter 22.

Figure 2A:
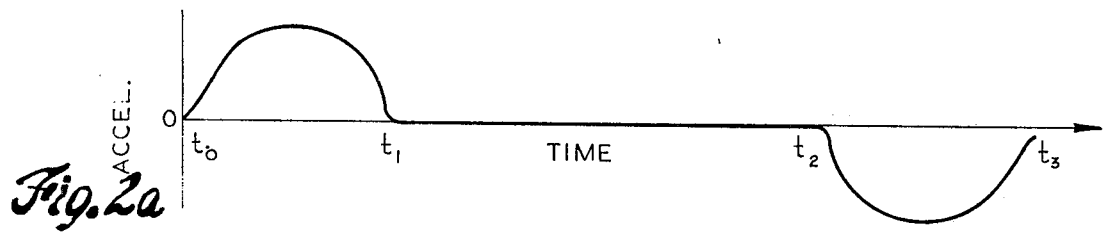
FIGS. 2a, 2b and 2c are diagrams illustrating the acceleration, velocity and position profiles, respectively, of the vehicle of FIG. 1 as controlled in accordance with the principles of this invention.
Figure 2B:
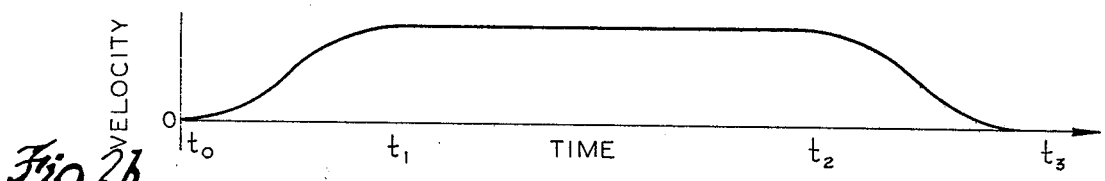
Figure 2C:
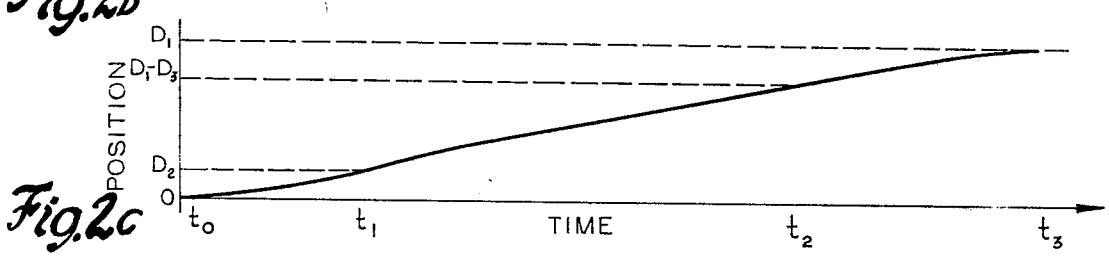

The operation of the system of FIG. 3 will be described with reference to FIGS. 2a through 2c. For initial conditions, it will be assumed that the vehicle 10 is at the start position 14, the latch 52 is reset so that the system is in the position control mode, and the counters 22 and 32 are reset to zero. Upon the enabling of the clock 18 at the time $t_0$ to supply clock pulses, the vehicle 10 is commanded to move to sequential commanded absolute positions represented by the output of the PROM 24. The time varying characteristics of the commanded position output of the PROM 24 in response to the output of the counter 22 produces the desired jerk and acceleration, velocity and position profiles illustrated in FIGS. 2a through 2c between times $t_0$ and $t_1$. At time $t_1$, the output of the counter 22 represents the predetermined commanded position $D_2$ at which it is desired for the vehicle 10 to enter into a constant velocity control mode as opposed to the position control mode prior to the time $t_1$. This position is sensed by the decoder 50 which sets the latch 52 whose output disables the AND gates 20 and 30. Thereafter, the position error signal output of the summer 36 and the velocity command signal output of the amplifier 38 are frozen so that the velocity of the vehicle as controlled by the velocity control loop remains constant. When the vehicle reaches the point $D_1-D_3$ at which deceleration and subsequent stopping of the vehicle at the stopping point 16 is desired, the receiver 58 senses the transmitted signal of the sender 56 and resets the latch circuit 52. Thereafter, the clock pulses from the clock 18 are coupled through the AND gate 20 to the counter 22 and speed pulses from the speed transducer 28 are coupled to the counter 32. Thereafter, the counter 22 is clocked to address the PROM 24 whose output represents commanded positions on the guideway 12 and whose time changing characteristics are such as to produce the desired vehicle motion characteristics as illustrated between the times $t_2$ and $t_3$ in FIGS. 2a through 2c. As the vehicle 10 approaches the stopping point 16, the rate of change of the commanded absolute position of the vehicle relative to the stopping point 16 decreases so that the position error output of the summer 36 decreases resulting in a decrease in the velocity of the vehicle 10. The output of the PROM 24 is such that the position error becomes zero when the vehicle 10 reaches the stopping point 16 on the guideway 12 resulting in a zero velocity command.

Numerous modifications of the system of FIG. 3 are contemplated. For example, means for resetting the counters 22 and 32 at the stopping point 16 are contemplated which may include an additional sending unit so that the vehicle is again in condition for movement over the guideway in the opposite direction in the manner previously described. Further, it is contemplated that if the acceleration and deceleration profiles of the vehicle are identical, the counter 22 may be counted down when entering the position control mode from the velocity control mode so that the address locations in the PROM 24 which provided for the desired jerk and acceleration values are again readdressed and provide for similar jerk and deceleration values. This countdown mode may be provided by the receiver 58 in response to a sensed signal from the sender 56.

The invention further contemplates the provision of means for compensating for starting point offset by determining the amount of movement of the vehicle 10 to a reference point along the guideway 12 after which the gain of the system may be adjusted to compensate for variances in the starting point of the vehicle.

The foregoing description of a peferred embodiment for the purpose of illustrating the invention is not to be considered as limiting the invention since many modifications may be made by one skilled in the art without departing from the scope of the invention.

I claim:

1. A system for controlling the movement of a vehicle over a predetermined guideway comprising:

means effective to generate a command signal having a value representing a commanded absolute position of the vehicle on the guideway relative to a reference point on said guideway, the value of the command signal varying with time in a manner so as to represent desired vehicle motion characteristics;

means effective to provide a position signal having a value representing the actual absolute position of the vehicle on the guideway relative to the reference point;

means responsive to the command signal and the position signal effective to generate a velocity control signal having a value relating to the vehicle position error relative to the commanded position; and means effective to control the velocity of the vehicle in accordance with the magnitude of the velocity control signal, wherein the vehicle motion characteristics over the length of the pathway are controlled in accordance with the time related characteristics of the commanded absolute vehicle position on the guideway.

2. A system for controlling the movement of a vehicle over a predetermined guideway comprising:

a clock effective to generate clock pulses at a substantially constant frequency;

a counter effective to count the clock pulses;

a memory having locations addressable in accordance with the count in the counter and including a number at each such location having a value representing a commanded absolute position of the vehicle on the guideway relative to a reference point on the guideway, the numbers at the locations sequentially addressed in response to consecutive counts in the counter having time varying values representing desired vehicle motion characteristics;

means effective to provide a position signal having a value representing the actual absolute position of the vehicle on the guideway relative to the reference point;

means responsive to the numbers recalled from the addressed locations in the memory and the position signal effective to generate a velocity control signal having a value relating to the vehicle position error relative to the commanded absolute position; and means effective to control the velocity of the vehicle in accordance with the magnitude of the velocity control signal, wherein the vehicle motion characteristics are controlled in accordance with the time related characteristics of the commanded absolute vehicle position on the roadway.

3. A system for controlling the movement of a vehicle over a predetermined guideway comprising:

a clock effective to generate clock pulses at a substantially constant frequency;

a counter effective to count the clock pulses;

a memory having locations addressable in accordance with the count in the counter and including a number at each such location having a value representing a commanded absolute position of the vehicle on the guideway relative to a reference point on the guideway, the numbers at the locations sequentially addressed in response to consecutive counts in the counter having time varying values representing desired vehicle motion characteristics;

means responsive to vehicle motion effective to generate speed pulses having a frequency representing vehicle speed;

a second counter effective to count the speed pulses, the net count representing the actual absolute position of the vehicle on the guideway;

means responsive to the numbers recalled from the addressed locations in the memory and the count of the second counter effective to generate a velocity control signal having a value relating to the vehicle position error relative to the commanded position;

means effective to control the velocity of the vehicle in accordance with the magnitude of the velocity control signal; and selectively operable means effective to inhibit the first and second counters from counting the clock pulses and the speed pulses, respectively, so as to maintain a constant value velocity control signal, the vehicle motion characteristics during the time period that the first and second counters are effective to count the clock pulses and the speed pulses, respectively, being controlled in accordance with the time related characteristics of the commanded absolute vehicle position on the roadway and during the period that the first and second counters are inhibited being controlled at a constant velocity value.

* * * * *